J. A. WERNER.
CASH AND AUTOGRAPHIC REGISTER.
APPLICATION FILED JAN. 25, 1909.

1,051,474.

Patented Jan. 28, 1913.
8 SHEETS—SHEET 5.

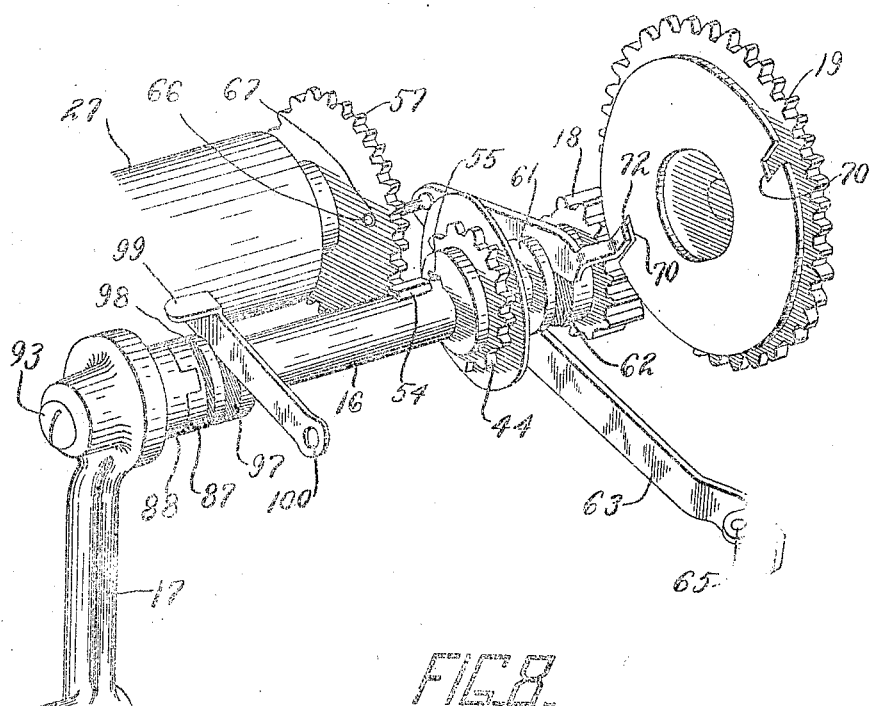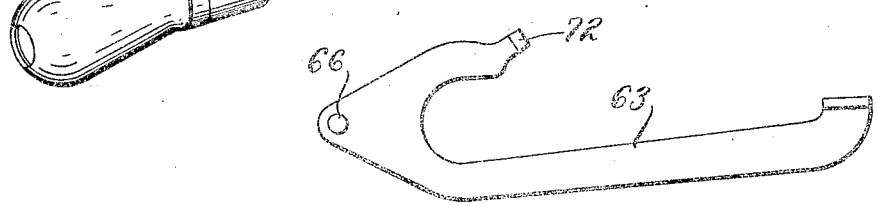

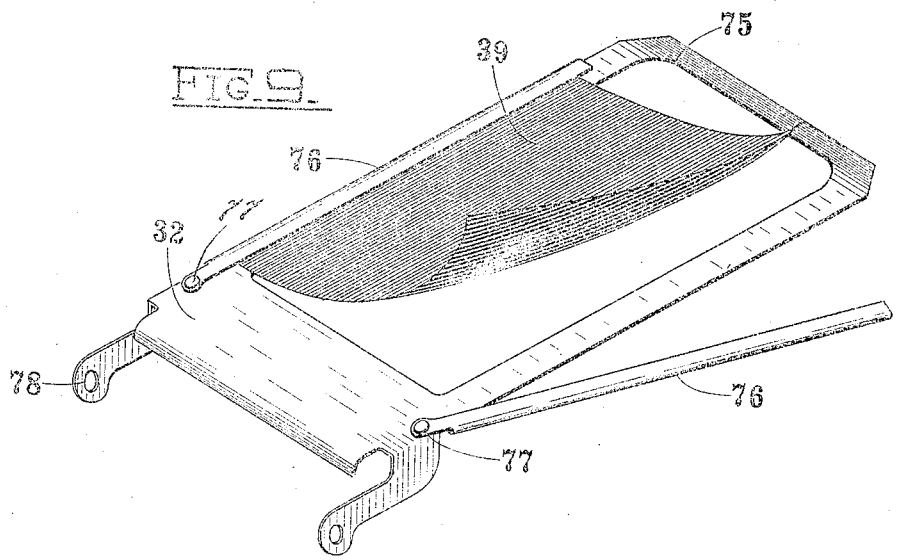
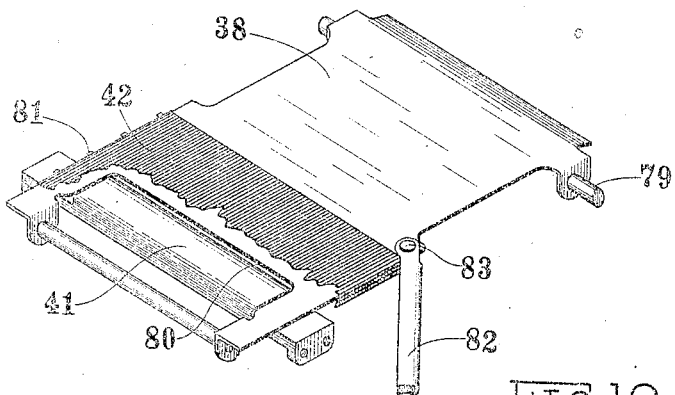

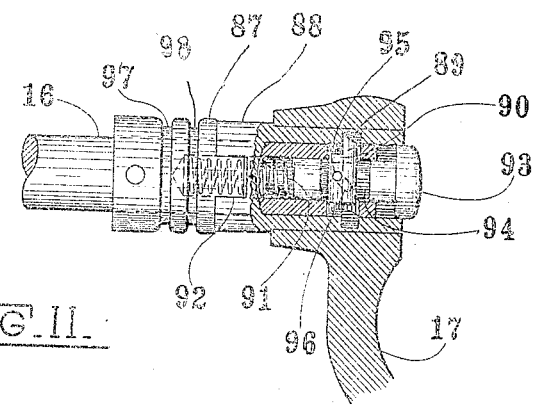
FIG.11.
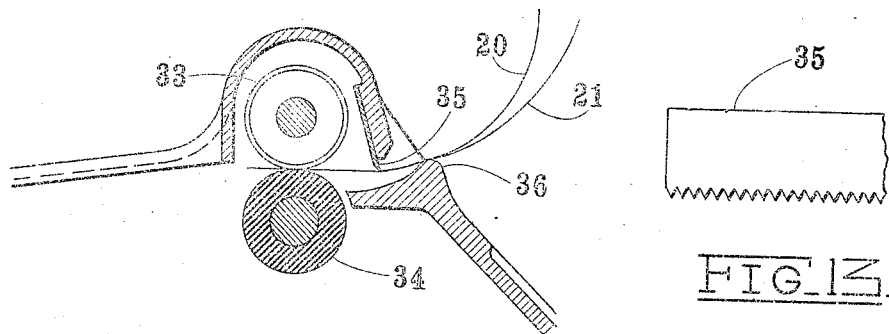
FIG.12.
FIG.12.

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND AUTOGRAPHIC REGISTER.

1,051,474.     Specification of Letters Patent.     Patented Jan. 28, 1913.

Application filed January 26, 1909. Serial No. 474,247.

*To all whom it may concern:*

Be it known that I, JOHN A. WERNER, a citizen of the United States, residing at Dayton, in the county of Montgomery and State of Ohio, have invented certain new and useful Improvements in Cash and Autographic Registers, of which I declare the following to be a full, clear, and exact description.

This invention relates to cash registers and has more particular relation to that class of machines in which the items are manually recorded and the total of said items is registered, indicated and recorded upon the operation of the machine.

The principal object of this invention is to provide means under control of the operator for establishing or disestablishing an operative relation between the operating mechanism of the machine and the feed devices for the sales strip upon which the items are manually recorded.

Another object of this invention is to prevent the establishment or disestablishment of an operative relation between the operating mechanism and the feed devices during an operation of the machine.

Another object of this invention is to provide the machine with a detachable operating handle which may be removed whenever it is desired to render the machine as a whole inoperative.

With these and incidental objects in view, the invention consists in certain novel features of construction and combinations of parts, the essential elements of which are set forth in appended claims, and a preferred form of embodiment of which is hereinafter described with reference to the drawings which accompany and form part of this specification.

Figure 1:
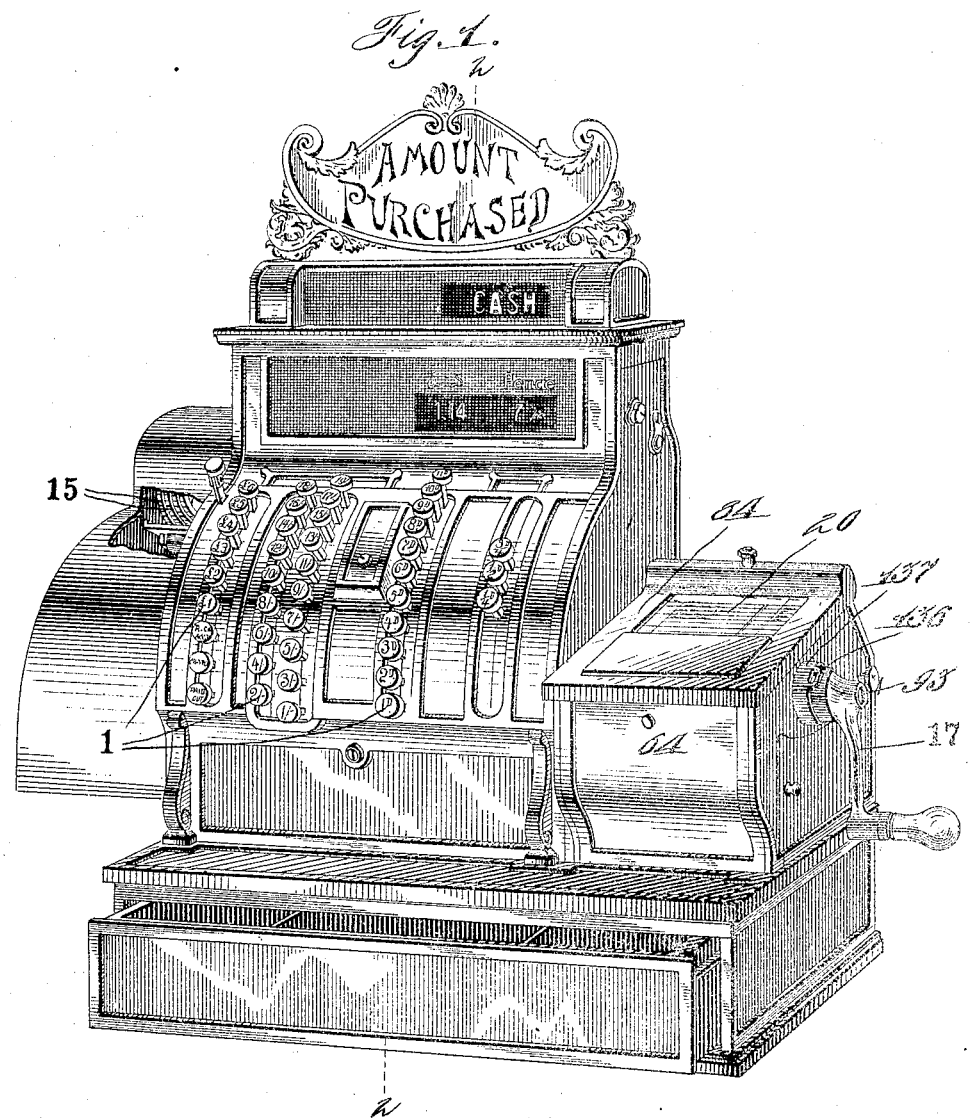
Figure 2:
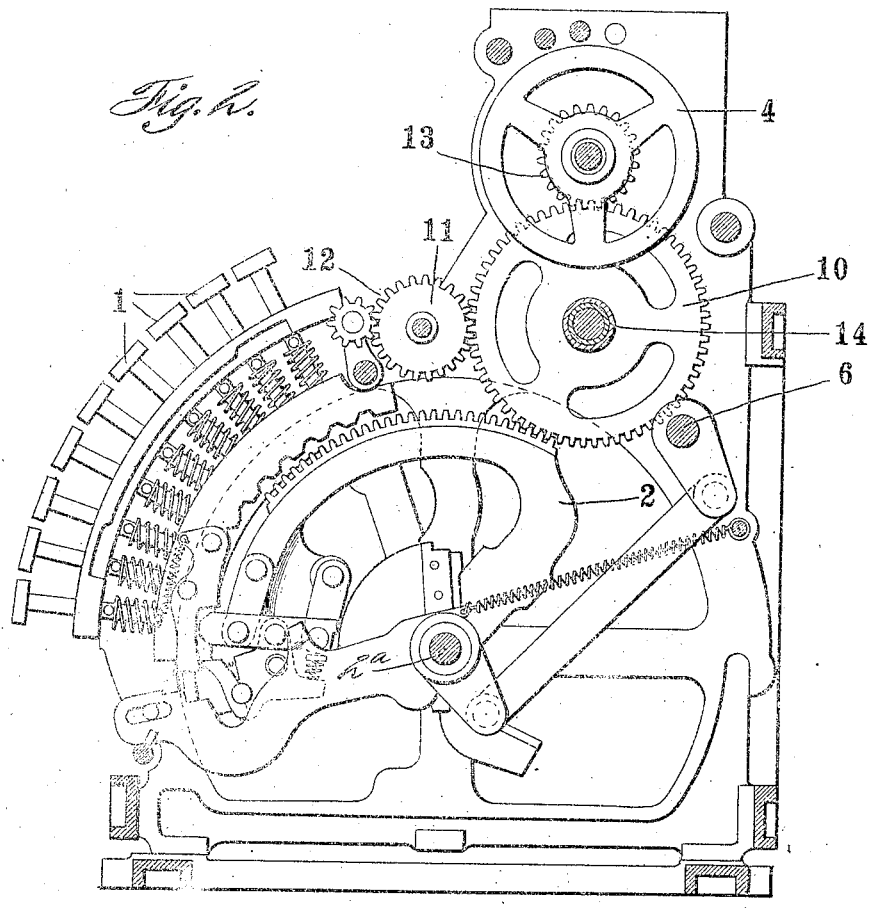
Figure 3:
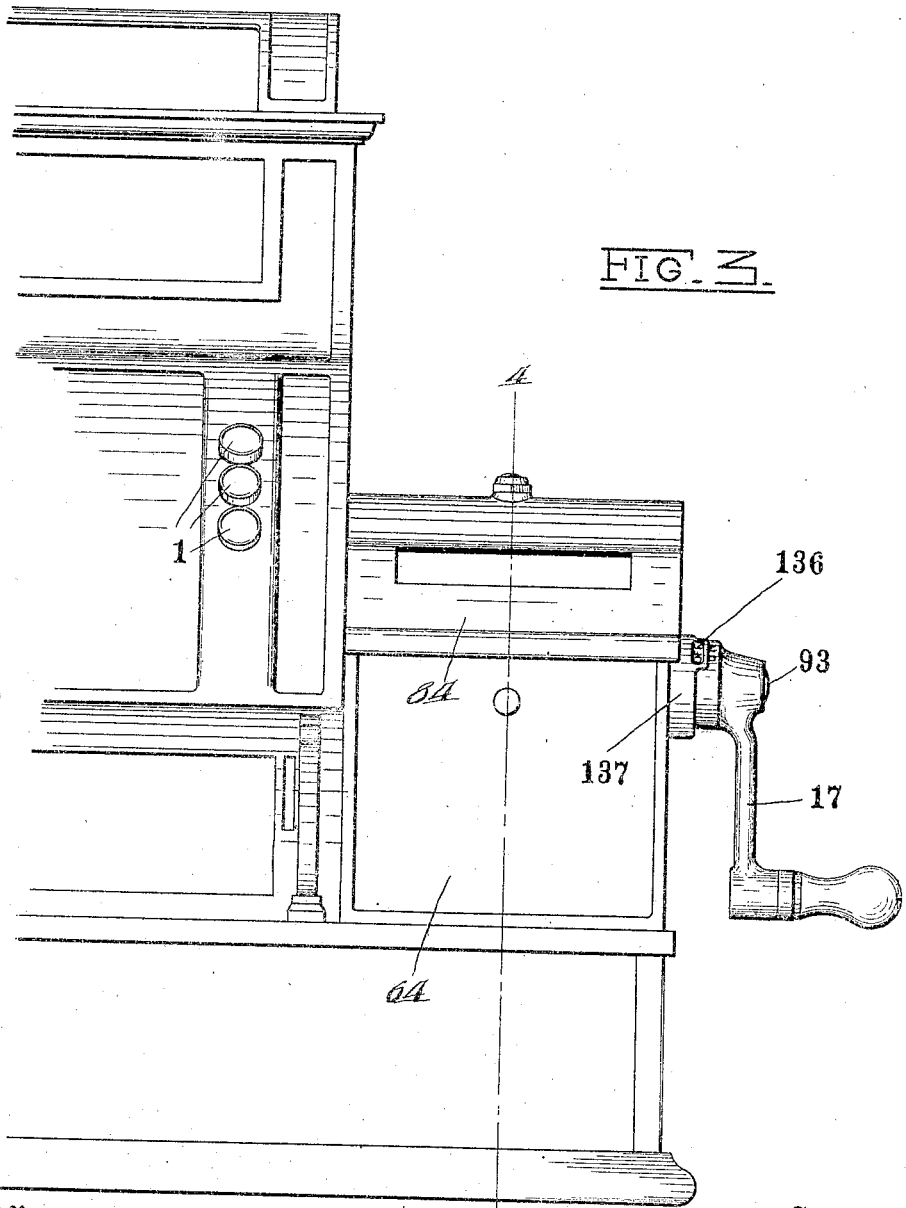
Figure 4:
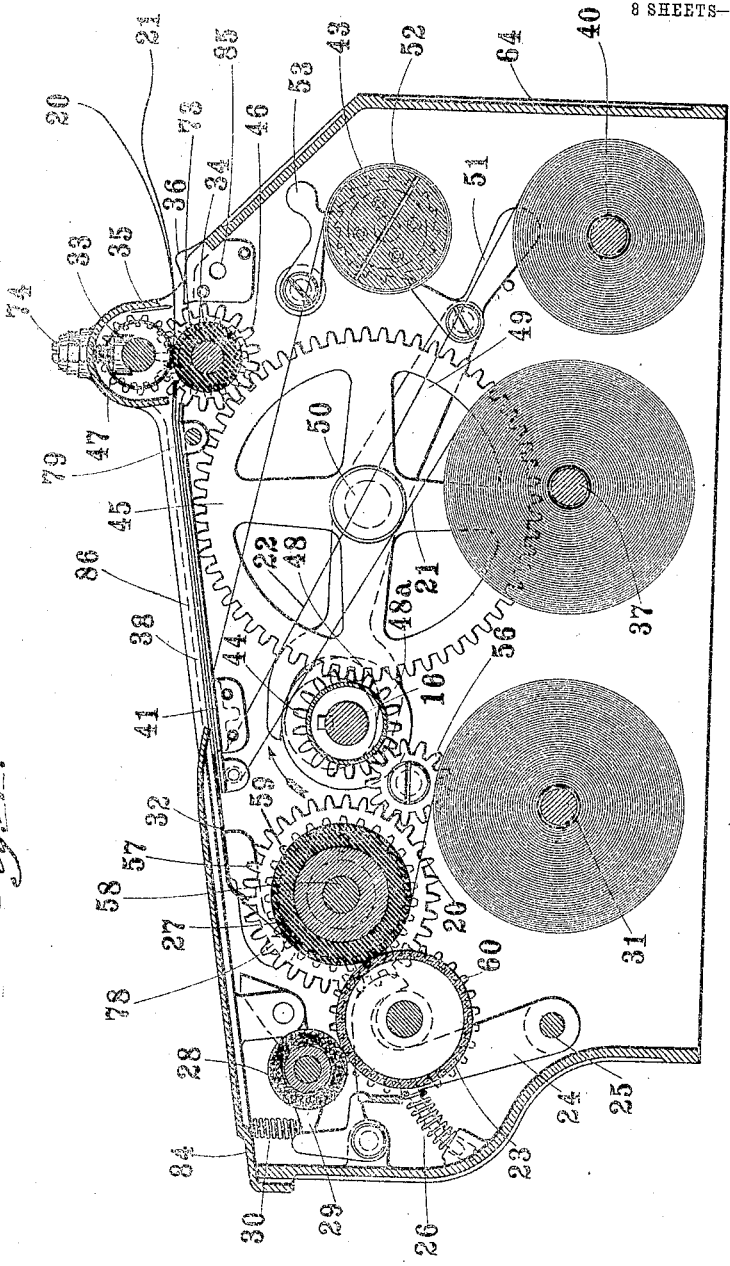
Figure 5:
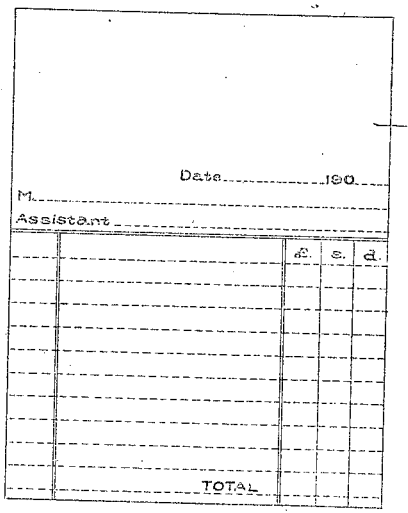
Figure 6:
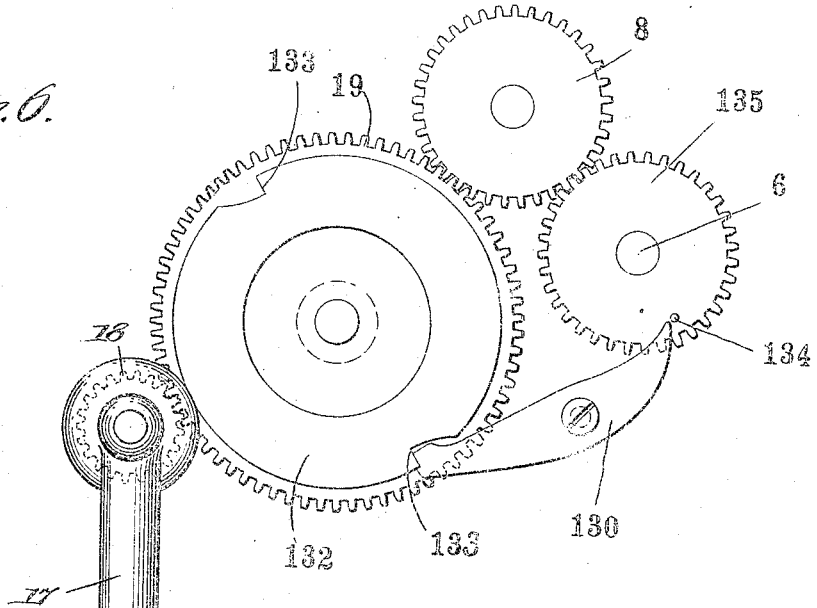

Of said drawings: Figure 1 is a perspective view of the combined mechanically recording register and the autographic register. Fig. 2 represents a transverse vertical section taken on the line 2—2 of Fig. 1. Fig. 3 shows in front elevation the autographic register and part of the main cash register. Fig. 4 represents a transverse vertical section of the autographic register taken on the line 4—4 of Fig. 3. Fig. 5 is a plan view of the original sales strip which is issued by the autographic register. Fig. 6 is a face view of the train of gears which connects the main drive shaft 16 with the register drive shaft 6. It also shows the stop which prevents further rotation of the crank 17 when the same has reached its home position. Fig. 7 is a perspective view of the main drive shaft and its connection with the operating mechanisms of the autographic and the main register. Fig. 8 is a detail of a locking device shown in Fig. 7. Fig. 9 is a perspective view of the holder for the carbon paper for the duplicate sales slip. Fig. 10 is a perspective view of the holder of the carbon paper for the summary strip. Fig. 11 is a detail partly in section of the operating crank handle and its connection with the main drive shaft. Fig. 12 represents a transverse vertical section of the paper cutting device of the autographic. Fig. 13 is a fragmentary detail of the serrated knife which is also shown in Fig. 12.

Described in general terms, this invention comprises a register proper which is provided with a series of banks of keys which represent different denominations. Whenever it is desired to register, record and indicate the total of a transaction, the proper keys are depressed and the operating handle turned. If it is desired to issue a sales slip containing an itemized statement of the transaction during an operation of the machine, the items of the transaction are manually entered upon an autographic register adjacent to the register proper and the operating handle given a lateral movement toward the register previous to turning. This lateral movement of the operating handle couples the feed devices for the sales slip with the operating mechanism, so that, upon turning the handle, a sales slip will be issued from the autographic register simultaneously with the registering, recording and indicating of the transaction upon the machine proper.

The keys 1 of the machine act as stops for the differentially movable segments 2 which are loosely mounted upon a rock shaft $2^a$, this shaft being rocked from the main rotation shaft 6. The segments 2 mesh with intermediate gears 10 which are secured to the inner end of nested sleeves 14. These gears in turn mesh with gears 11 of the registering mechanism 12, and gears 13, secured to the indicators 4. The outer ends of the nested sleeves 14 carry type segments 15, (see Fig. 1) which are arranged to print upon a record strip the amount represented by the keys depressed, all of which is well known and fully described and illustrated in the patent granted to Cleal and Reinhard, No. 580,378, dated April 13, 1897.

Referring now to Fig. 6, the gearing for imparting a complete rotation to the shaft 6 upon each operation of the machine will be described. A crank handle 17 is suitably mounted upon a short shaft 16, which carries at its inner end a pinion 18. This pinion 18 meshes with a large gear 19, which, in turn, meshes with a gear 8, and this in turn meshes with a gear 135 secured to one end of the shaft 6. This gearing is so proportioned that two turns of the operating handle 17 is required for a complete rotation of the shaft 6; the large gear 19 being of such size that it only rotates a half revolution for each revolution imparted to the shaft 6. Attached to the side of the large gear 19 is a disk 132 having notches 133 cut in opposite sides thereof. A pawl 130 is arranged to be moved into a position to engage with one of the notches of the disk 132 at the end of the rotation of the shaft 6 by means of a pin 134 mounted upon the gear 135, which contacts with the rear end of the pawl and rocks same about its pivot so that its forward end will engage with one of the notches 133, as shown in Fig. 6. It is necessary before starting the handle 17 to move it slightly rearward so that the forward end of the pawl 130 may drop out of the notch 133, with which it is in engagement.

An autographic register 64 is mounted adjacent to the machine proper and the shaft 16 to which the operating handle 17 is secured, extends through said autographic register, as shown in Figs. 1 and 4. Mounted upon the shaft 16 within the casing of the autographic register is a pinion 44 which engages with a gear 45. This gear in turn meshes with a pinion 46 secured to the lower one of the feed rollers 34. Attached to the side of the pinion 46 is a smaller pinion 73 which meshes with a pinion 47 secured to the side of the upper feed roller 33.

When the autographic register is operated, it is arranged to issue one original and a duplicate sales slip and to wind up the summary record strip within the machine. It is also the purpose of this invention to print the original sales slip as it is issued. The original sales slip 20 is fed from a supply roll 31 around the platen roll 27 and over a writing table 32 to the feed rollers 33 and 34. A carbon sheet 39 is secured to the writing table 32 by suitable clamps 76 which are pivoted as at 77, (see Fig. 9). This table 32 is pivoted as at 78 to the casing of the autographic register. Beneath this table 32 is mounted a smaller table 38 (see Fig. 10), which is pivoted as at 79 to the casing of the register. These tables 32 and 38 are pivoted so that the supply rolls 31, 37 and 40 may be readily inserted and withdrawn from the casing. This casing is provided with a lid 84 which is pivoted as at 85 to the rear end of the autographic register. A duplicate slip 21 is led from a supply roll 37 over the table 38 and beneath the carbon 39 to the feed rollers 33 and 34. The table 32 is cut away as at 75 to allow the entries that are made upon the original to be transferred to the duplicate by means of the carbon sheet 39. The strips 20 and 21 are fed from the rollers 32 and 34 under a knife 35 and over the paper guide 36. This knife 35 is provided with a serrated edge, as shown in Fig. 13, against which the slips are carried when it is desired to tear them off. The upper feed roller 33 is held under suitable tension in engagement with the roller 34 by means of a set screw 74. A narrow strip of carbon 42, as shown in Fig. 10, is fastened by means of teeth 81 to one side of the table 38 and at its other side is secured, by means of a clamp 82, which is pivoted as at 83, to the table 38. This table 38 is cut away as at 80 and a summary strip 22 is fed from a supply roll 40 over a narrow writing table 38 and then passes to a storage roll 43.

From the above description it will be seen that the items, as they are entered upon the original strip, will be also recorded upon the duplicate, while only the total of the items will be recorded upon the summary strip.

The feed of the summary strip is accomplished by means of a lever 49 which is pivoted as at 50, and is provided at its forward end with a bifurcated portion which straddles an eccentric 48, secured to the side of the disk 48$^a$, to which is also secured the pinion 44. The rear end of the lever 49 is provided with a pawl 51 which engages a ratchet 52 fastened to the side of the storage roll 43. As the pinion 44 is rotated, the eccentric 48 will also be rotated and by means of the bifurcated forward end of the lever 49 rock said lever to feed the summary record strip. A retaining pawl 53 is suitably mounted within the register casing and engages the ratchet 52 to prevent any retrograde movement of the storage roller.

An electro roller 23 is suitably mounted in a bracket, the side arms 24 of which are pivoted to the casing of the autographic register as at 25. This roller is held in contact with the original sales slip 20 by means of a coiled spring 26 interposed between the bracket and the casing of the register. This electro roller is inked by means of a roller 28 suitably secured within bracket arms 29, and is held in contact with the electro roller by means of a coiled spring 30. The electro roll 23 may carry any suitable type so as to print any desired matter upon the original strip 20, as shown in Fig. 5. The electro roll 23 and the platen roll 27 also act as feed rolls for the original strip 20, motion being imparted to the platen roll 27 by means of a pinion 56 which meshes with the pinion 44 mounted upon shaft 16, the pinion 56 in turn meshing with a gear 57 secured to one end of the platen roller 27. Adjacent to the gear 57 is a smaller gear 59 which meshes with a gear 60 secured to the electro roll 27. This gearing is so proportioned that for every two rotations of the crank handle 17, a complete revolution is imparted to the rolls 23 and 27.

The pinion 18 secured to the shaft 16 is of double width so that when the shaft is given a longitudinal movement, as hereinafter described, the pinion 18 will continue in mesh with the gear 19 as shown in Fig. 7. The shaft 16 is provided with a feather 54 which passes into a recess 55 formed in a hub of the pinion 44 when the shaft is moved longitudinally so as to couple up the pinion 44 with the shaft 16. Whenever the pinion 44 is thus coupled to the shaft 16, the feeding devices for the strips of the autographic register will become operative, as previously described, but when this feather 54 is out of the recess 55 of the pinion 44 the autographic register will be inoperative while the main register will still be operative.

Referring to Figs. 7 and 11, it will be seen that a sleeve 87 is rigidly secured to the shaft 16. This sleeve is provided with annular grooves 97 and 98 with which a pawl 99 engages so as to hold the shaft 16 in either of its adjusted positions. The extreme outer end of the shaft 16 has loosely mounted upon it a sleeve 88 to which is secured the operating crank handle 17. The sleeves 87 and 88 form members of a clutch so that a rotary movement of the handle 17 will be imparted to the shaft 16. This handle 17 may be detached from shaft 16 by the following described means. A recess 92 is bored in the outer end of the shaft 16 and a plunger 93 is mounted therein. Interposed between the inner end of the plunger 93 and the end of the recess 92 is a spring 91 which forces the plunger 93 outwardly. This plunger 93 has a reduced portion 94 which is straddled by a pin 90. This pin 90 is provided with a stud 95 which passes through an inclined slot 96 formed in the reduced portion 94 of the plunger 93. The pin 90 passes through an opening formed upon the upper side of the outer end of the shaft 16 and enters into an annular groove 89, formed in the sleeve 88. It will be seen from the above description that when it is desired to remove the crank handle 17, all that is necessary is to force the outer end of the plunger 93 inwardly, which movement, through means of the inclined slot 96 formed in the reduced portion 94 of the plunger 93, will withdraw the pin 90 out of the annular groove 89, thereby permitting the handle 17 to be removed.

Pivoted to the casing of the autographic register as at 65, (see Fig. 7), is a lever 63, at the forward end of which is a pin 66, which, when the crank handle 17 is in normal position, and the pinion 44 disconnected from the shaft 16, enters a recess 67 formed in the gear 57 attached to the platen roller 27. By this means, any accidental displacement of the feeding devices for the strips of the autographic register is prevented, while the pinion 44 is disconnected from the shaft 16. When it is desired to connect the feeding devices of the strips of the autographic register with the operating mechanism, the latch 99 is raised from its pivot bearing 100 and the operating handle 17 and shaft 16 are slid longitudinally toward the register. This movement of the shaft 16 carries the feather 54 into the recess 55 of the hub of the pinion 44. Secured to the shaft 16 is a disk 61 provided with an annular groove 62 in which rests a yoke portion of the lever 63. This portion of the lever is provided with a bent lug 72 which normally lies adjacent to one of two notches 70 formed upon the opposite side of a disk 68, which is secured to the large gear 19. When the shaft is shifted longitudinally, as hereinbefore described, this lug 72 passes through one of the notches 70 to the inside of the disk 68. When the crank handle 17 is started, the notch 70 will pass out of engagement with the lug 72 and the shaft 16 will thereby be held in its adjusted position until the operation of the machine is complete, at which time the other notch 70 formed in the disk 68, will be brought adjacent to the lug 72. When the shaft 16 is shifted longitudinally to throw on the feeding devices for the strips of the autographic register, the pins 66 will also be carried out of the recess 67 formed in the gear 57, so that the feeding devices may be operated.

From the above description, it will be seen that the lug 72 will engage with one of the sides of the disk 68, when the disk is rotated, and thereby prevent the shaft 16 from being connected with the feeding devices or disconnected, as the case may be.

As shown in Figs. 1 and 3, the hub of the operating handle 17 is provided with suitable lettering which appears through the opening 136 formed in a ring 137 projecting from the casing of the autographic register, so as to indicate whether the feeding devices for the strips of the autographic register is in operative relation with the operating mechanism. This wording, as shown in said figures, consists of the words "On" and "Off".

It will be seen from the above description that the feeding devices for the strips of the autographic register may be left on permanently, that is, sales slips be issued at each operation of the machine, and also, that a record of the operation will be retained in the machine.

While the form of mechanism herein shown and described, is admirably adapted to fulfil the objects primarily stated, it is to be understod that it is not intended to confine the invention to the one form of embodiment herein disclosed, for it is susceptible of embodiment in various forms all coming within the scope of the claims which follow.

What is claimed is:

1. In an autographic register, the combination with an operating handle for driving the register, of feed devices for the sales strip of said register normally inoperative, and means controlled by a manipulation of the operating handle for rendering the feed devices operative.

2. In an autographic register, the combination with an operating instrumentality for driving the register having movements in different directions, of feed devices for the sales strip of said register normally inoperative, and means controlled by the movement of the operating instrumentality in one direction for rendering the feed devices operative and in the other direction to feed the sales strip.

3. In a combined mechanical and autographic register, the combination with an operating mechanism, of feed devices for the sales strips of the autograph, and a longitudinally movable driving crank shaft for establishing an operative relation between the operating mechanism and the feed devices.

4. In a combined mechanical and autographic register, the combination with an operating mechanism, of feed devices for the sales strips of the autograph, a longitudinally movable driving crank shaft for establishing an operative relation between the operating mechanism and the feed devices, and means for indicating whether such relation has been established.

5. In a combined mechanical and autographic register, the combination with an operating mechanism, of feed devices for the sales strips of the autograph, a longitudinally movable driving crank shaft for establishing an operative relation between the operating mechanism and the feed devices, and means for preventing the disestablishment of such relation during an operation of the operating mechanism.

6. In a combined mechanical and autographic register, the combination with an operating mechanism therefor, of feed devices for the sales strips of the autograph, a longitudinally movable driving crank shaft for establishing an operative relation between the operating mechanism and the feed devices, and a disk and lever for preventing the disestablishment of such relation during an operation of the operating mechanism.

7. In a machine of the class described, the combination with an operating handle, of a shaft, and a spring controlled plunger mounted concentric with the shaft and within the hub of the operating handle for securing the handle to said shaft.

In testimony whereof I affix my signature in the presence of two witnesses.

JOHN A. WERNER.

Witnesses:
FRED E. HAMILTON,
R. RUMMLER.